(12) United States Patent
Hansen

(10) Patent No.: US 9,075,569 B1
(45) Date of Patent: Jul. 7, 2015

(54) DEVICE AND ASSOCIATED ELEMENT FOR COUPLING TO THE DEVICE

(75) Inventor: Linsey R. Hansen, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 392 days.

(21) Appl. No.: 13/558,035

(22) Filed: Jul. 25, 2012

(51) Int. Cl.
*G09G 5/00* (2006.01)
*G06F 1/16* (2006.01)

(52) U.S. Cl.
CPC .................................. *G06F 1/1626* (2013.01)

(58) Field of Classification Search
CPC .......... G06F 2200/1614; G06F 1/1626; G06F 3/0481
USPC .......................................................... 345/649
See application file for complete search history.

(56) References Cited

U.S. PATENT DOCUMENTS

| 2004/0201595 | A1* | 10/2004 | Manchester | 345/649 |
| 2012/0007822 | A1* | 1/2012 | Luo | 345/173 |
| 2012/0187706 | A1* | 7/2012 | Kannaka | 294/137 |
| 2012/0194998 | A1* | 8/2012 | McClure et al. | 361/679.56 |

* cited by examiner

*Primary Examiner* — Peter Hoang
(74) *Attorney, Agent, or Firm* — Sutherland Asbill & Brennan LLP

(57) ABSTRACT

A device includes one or more actuatable elements that are actuated upon coupling of an element to the device at one or more positions with respect to the device. One or more device characteristics such as a device state or device settings may be established based on actuation of the actuatable elements.

34 Claims, 13 Drawing Sheets

US 9,075,569 B1

DEVICE AND ASSOCIATED ELEMENT FOR COUPLING TO THE DEVICE

BACKGROUND

The rise in the popularity and use of user devices such as tablet and smartphone devices has led to a plethora of accessories for improving the ease of use of such devices. These accessories generally include stands for maintaining the user devices in an elevated or raised position, covers or casings of various sorts for protecting the user devices from damage, various accessories for improving the ease with which user devices can be handled and transported, and so forth.

BRIEF DESCRIPTION OF THE DRAWINGS

The detailed description is set forth with reference to the accompanying drawings. In the drawings, the left-most digit(s) of a reference numeral identifies the drawing in which the reference numeral first appears. The use of the same reference numerals indicates similar or identical items. Various embodiments may utilize elements and/or components other than those illustrated in the drawings and some elements and/or components may not be present in various embodiments. Throughout this disclosure, depending on the context, singular and plural terminology may be used interchangeably.

DETAILED DESCRIPTION

Overview

User devices such as mobile tablet and smartphone devices have increased the speed and efficiency with which information is communicated and disseminated. By virtue of the pervasive mobile connectivity of such devices, restrictions on the time and location of information sharing have largely been eliminated. With the rise in the use and prevalence of mobile devices, numerous accessories have been developed to improve the ease of use of such devices. Examples of such accessories include covers or casings for protecting mobile devices from damage and improving the ease with which mobile devices are handled, stands or other apparatuses for maintaining a mobile device in an elevated or raised position, various input/output devices (e.g., wireless keyboards) for allowing a user to provide wireless input to a mobile device, and so forth. However, none of these conventional device accessories are capable of facilitating varied device functionality based on the nature of the coupling of the accessory to the device.

Figure 1:
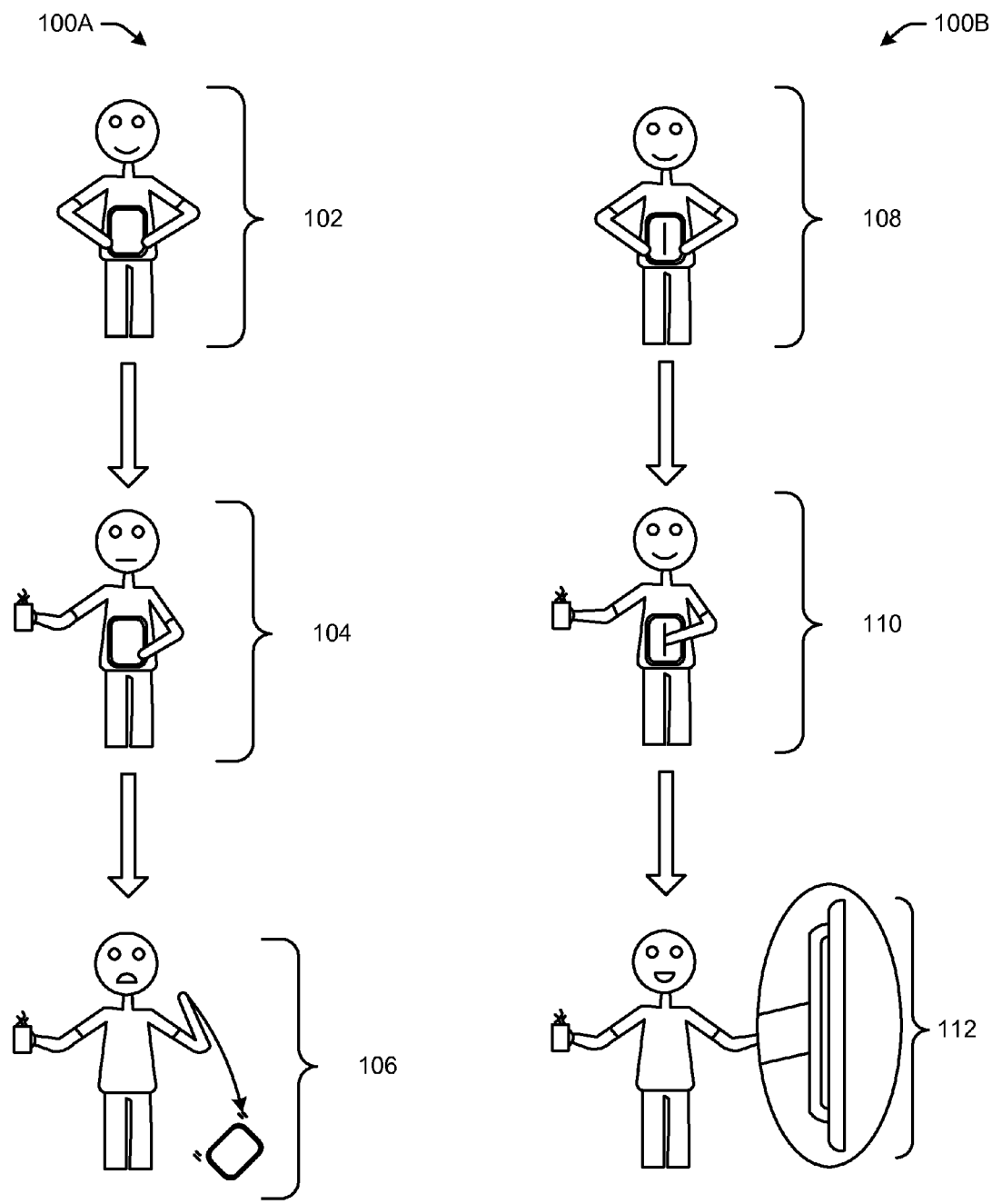
FIG. 1 schematically depicts a conventional interaction between a user and a user device and an interaction between a user and a user device in accordance with one or more embodiments of the disclosure.

FIG. 1 depicts an illustrative interaction 100A between a user and a conventional user device. In stage 102 of the interaction 100A, a user is grasping the user device with both hands. In stage 104, the user grasps the user device with one hand while grasping another object (e.g., a beverage) with his/her other hand. In stage 106, the user loses his/her handle on the device as a result of the difficulty associated with grasping the device with only one hand.

FIG. 1 also depicts an illustrative interaction 100B between a user and a user device in accordance with one or more embodiments of the disclosure. The user device depicted in the interaction 100B has an example grip element coupled thereto. In a first stage 108 of the interaction 100B, the user is grasping the user device with both hands. In a second stage 110, the user grasps the grip element coupled to the user device with one hand and grasps another object (e.g., a beverage) with the other hand. In stage 112, the user is depicted as being able to comfortably grasp, with one hand, the grip element coupled to the user device while continuing to grasp the beverage with the other hand.

FIG. 1 depicts one of several advantages associated with a user device element and a grip element disclosed herein. That is, a grip element coupled to a user device as disclosed herein allows a user to comfortably grasp the user device via the grip element, while further freeing up the user's other hand to, for example, grasp other objects or perform other tasks. As user devices such as tablet devices and smartphones become thinner, lighter, longer, and wider, they also become more difficult to handle comfortably. The grip element disclosed herein improves the ease of handling of such devices. The grip element and user device disclosed herein also provide numerous other advantages relating to being able to control device functionality in various ways depending on the position at which the grip element is coupled to the device.

It should be appreciated that while various embodiments of the disclosure will be described through reference to various example grip elements, any element comprising at least one coupling portion configured to be coupled to a user device is within the scope of this disclosure. In some embodiments, the element may be a grip element that includes at least one graspable portion capable of being grasped by a user and by which the user may establish one or more positions of the device.

In certain embodiments, the element may include at least one engagement portion that facilitates, when the element is coupled to the user device, establishment of one or more positions of the device upon engagement of the at least one engagement portion. The at least one engagement portion may, in various embodiments, include at least one engagement surface capable of interfacing with one or more external surfaces in order to establish or maintain the user device in one or more positions. The at least one engagement portion may also, in various embodiments, correspond to the graspable portion described above.

In various embodiments, when the element is coupled to the device, the device may be fixed in a static position with respect to the element. As such, in such embodiments, the user may manipulate a position of the device (e.g., rotate the device, maintain the device in an elevated position, etc.) using the element coupled to the device.

While embodiments of the disclosure will be described through reference to a grip element, it should be noted that any of the described embodiments as well as any other embodiments of the disclosure encompass any element configured to be coupled to a user device and capable of affecting device characteristics based on the nature of the coupling.

A device is disclosed that includes one or more actuatable elements configured to be actuated by a grip element upon coupling of the grip element to the device. The grip element may include one or more coupling portions configured to actuate one or more actuatable elements of a device upon coupling of the grip element to the device. Also disclosed herein is an apparatus that includes a device having one or more actuatable elements and a grip element configured to actuate the actuatable element(s) upon coupling of the grip element to the device. Additionally, methods are disclosed for actuating one or more actuatable elements of a device upon coupling of a grip element to the device and modifying one or more device characteristics based at least in part on the actuation of the actuatable element(s). Other embodiments of the disclosure relate to computer-readable media for performing such methods.

Actuation of various actuatable elements of a device may generate one or more signals that are provided to a control module of the device. Based on the received signal(s), the control module may cause one or more device characteristics to be established/modified. The device characteristics(s) may correspond to one or more device states or one or more device settings. A device state may include, for example, a sleep state, a wake state, a powered-on state, a powered-off state, and so forth. The device setting(s) may include any potentially adjustable setting of the device including, but not limited to, an orientation of information displayed on a display screen, a zoom level of the displayed information, a sound setting, a display panel light setting, and so forth. The device setting(s) may also include various other device functionality such as Wi-Fi settings (settings associated with any wireless local area network based on the Institute of Electrical and Electronics Engineers (IEEE) 802.11 wireless communication standards), Global Positioning System (GPS) settings, cellular communications network settings, and so forth.

In certain embodiments, actuation of a first set of actuatable elements of the device may cause the control module to establish a first orientation for information displayed by the device. The information may include text, images, video, and so forth which may be displayed via, for example, a display panel of the device. In other embodiments, actuation of a second set of actuatable elements of the device may cause the control module to establish a second orientation of information displayed by the device. Actuation of the second set of actuatable elements subsequent to actuation of the first set of actuatable elements may cause the control module to modify the orientation of the displayed information from the first orientation to the second orientation. In certain embodiments, actuation of the first set of actuatable elements and actuation of the second set of actuatable elements may cause the displayed information to be locked in the first orientation and the second orientation, respectively. The displayed information may be locked in the respective established orientation as long as the respective set of actuatable elements remains actuated.

In various other embodiments, various other device settings may be controlled via actuation of different sets of actuatable elements. For example, the control module may be caused to establish a particular zoom level of the displayed information, sound setting, display panel light setting, other device functionality, and so forth upon detecting actuation of a first set of actuatable elements. Further, upon actuation of a second set of actuatable elements, actuation signals may be provided to the control module, causing the control module to establish a different zoom level, sound setting, display panel light setting, etc. While embodiments of the disclosure will primarily be described through reference to a device setting relating to orientation of information displayed by the device, it should be appreciated that embodiments of the disclosure also encompass any device settings, including any of those previously mentioned.

In certain other embodiments, actuation of a set of actuatable elements may cause the control module of the device to establish/modify a device state. For example, actuation of the set of actuatable elements may cause the control module to initiate a sleep mode for the device or power the device down. Alternatively, actuation of the set of actuatable elements may cause the control module to wake the device up from a sleep mode or power the device up. As long as the set of actuatable elements remains actuated, the control module may cause the corresponding device state to be maintained. For example, the control module may cause the corresponding device state to be maintained for a duration of actuation of the corresponding set of actuatable elements by a grip element coupled to the device.

Actuation of another set of actuatable elements may then cause the control module to modify the current device state to establish a new device state. The new device state established upon actuation of the another set of actuatable elements may correspond to a different device state than the device state established and maintained upon actuation of the initial set of actuatable elements. For example, if the control module initiates a sleep mode for the device upon actuation of a set of actuatable elements, the control module may wake the device up from the sleep mode upon actuation of the different set of actuatable elements, or vice versa. Similarly, if the control module powers the device down upon actuation of a set of actuatable elements, the control module may power the device up upon actuation of a different set of actuatable elements, or vice versa. Alternatively, the new device state may be established merely by de-coupling of the grip element from the device, thereby resulting in the set of actuatable elements no longer being actuated.

The first set of actuatable elements and the second set of actuatable elements may include one or more of the same actuatable elements. The first set of actuatable elements or the second set of actuatable elements may be actuated by one or more portions of a grip element upon coupling of the grip element to the device. In certain embodiments, the actuatable elements may be actuated by coupling portions of the grip element that correspond to point(s) of the attachment of the grip element to the device. In other embodiments, the actuatable elements may be actuated by portions of the grip element that are different from the point(s) of attachment of the grip element to the device. In certain embodiments, the actuatable elements may perform dual functions of maintaining the grip element in a coupled state with respect to the device and of generating actuation signals upon actuation by the grip element.

For example, in some embodiments, the actuatable elements may be magnets that couple to magnets provided on the grip element via a magnetic force there between. Further, the magnetic field generated by the magnets provided on the grip element may magnetically actuate the magnets provided on the device, which may, in turn, generate actuation signals that are provided to the control module of the device. Alternatively, the magnetic force applied to the magnets provided on the device upon coupling of the grip element to the device may actuate other actuatable elements of the device (via electrical, mechanical, magnetic, etc., actuation) to generate the actuation signals. The control module may be configured to modify one or more device characteristics based at least in part on the actuation signals as described earlier.

In other embodiments, the grip element may be coupled to the device via a mechanical connection such as a snap-fit connection, an interlocking of one or more portions of the grip element into groove(s) provided on the device or vice versa, and so forth. Mechanical coupling of the grip element to the device may cause a mechanical, electrical, magnetic (or any combination thereof) actuatable element provided in connection with the device to be actuated. While specific examples of actuatable elements and coupling mechanisms have been described, one of ordinary skill in the art will appreciate that the element may be coupled to the device using any suitable coupling mechanism and may actuate any suitable actuatable element of the device according to any appropriate actuation mechanism.

The actuatable elements may include any suitable element capable of being actuated upon application of a force to the element and capable of generating an actuation signal upon actuation. A control module of a device to which the grip element is coupled may receive one or more actuation signals as input. One or more processors of the device may execute computer-executable instructions provided as at least part of the control module to establish or modify one or more device characteristics based at least in part on the received actuation signals. The control module may include any combination of hardware or software for performing the various operations described herein.

As previously described, the device characteristics that are established or modified may include one or more device states or one or more device settings. A device state may include, for example, a sleep state, a wake state, a powered-on state, a powered-off state, and so forth. The device setting(s) may include any potentially adjustable setting of the device including, but not limited to, an orientation of information displayed on a displayed screen, a zoom level of the displayed information, a sound setting, a display panel light setting, and so forth. The device setting(s) may also include various other device functionality such as Wi-Fi settings, GPS settings, cellular communications network settings, and so forth.

The actuatable elements may include magnetic actuatable elements, mechanical actuatable elements, electrical actuatable elements, or any combination thereof. However, this disclosure is not limited to any particular type of actuatable element and any suitable actuatable element may be used. The actuatable elements may be disposed on the device in any suitable manner and may extend, at least partially, into an interior of the device or may be disposed entirely on an exterior surface of the device. The actuatable elements may be electrically or otherwise coupled to internal circuitry of the device such that actuation signal(s) generated upon actuation of the actuatable elements are transmitted to the control module of the device. Further, the actuatable elements may be arranged in any suitable arrangement on the device. For example, the actuatable elements may be arranged in a grid-like pattern or any other arrangement on a back surface of the device (e.g., a surface of the device that opposes the display panel). In other embodiments, the actuatable elements may correspond to magnetic bars or strips adhered to any exterior surface of the device. For example, the magnetic strips or bars may be disposed along edge portions of a back surface of the device.

In certain embodiments, coupling of the grip element to the device at different positions with respect to the device may actuate different sets of actuatable elements, and thus may cause the control module to establish or modify the device characteristics in different ways. For example, when a grip element is coupled to a user device at a first position in relation to the device, the grip element may actuate certain actuatable element(s) of the device, which may, in turn, generate one or more signals that are provided as input to a control module of the device to cause the control module to establish a first orientation for displayed information or to establish/modify a device state accordingly. In contrast, when a grip element is coupled to a user device at a second position in relation to the device that is different from the first position, the grip element may actuate certain other actuatable element(s) of the device, which may, in turn, generate one or more signals that are provided as input to the control module of the device to cause the control module to establish a second orientation for the displayed information that is different from the first orientation or to establish a new device state or modify the device state in a different manner.

In certain embodiments, the displayed information may be locked in a particular orientation as long as corresponding actuatable elements remain actuated. As such, rotation of the device, and in particular, rotation of the display panel of the device, may not cause the displayed information to be re-oriented as long as the grip element is coupled to the device to actuate the corresponding actuatable elements. In such embodiments. if the grip element is removed from the device, the orientation of the displayed information may be unlocked and may be determined based on positioning of the device using, for example, an accelerometer. Further, in certain embodiments, the orientation of the displayed information may be unlocked and determined based on positioning of the device in response to a user input to the device instructing the device to unlock the locked orientation of the displayed information despite the continued actuation of the corresponding actuatable elements by the coupled grip element. For example, one or more switches may be closed to prevent the actuation signals from reaching the control module, thereby unlocking the orientation of the displayed information.

Similarly, the control module of a device may, in certain embodiments, lock the device in a particular state upon actuation of certain actuatable elements by coupling of the grip element to the device. For example, coupling of the grip element to the device in a particular position may cause the control module to initiate a sleep state for the device. The device may remain locked in a sleep state as long as the corresponding actuatable elements remain actuated by the grip element. De-coupling of the grip element from the device may automatically cause the device to wake up. Alternatively, the device may remain in a sleep state upon de-coupling of the grip element until the device receives a user input instructing the device to wake up. A user may also be provided with the capability to unlock the device state despite the continued actuation of corresponding actuatable elements by the grip element. For example, even though the grip element may remain coupled to the device, the device state established by the coupling of the grip element may be unlocked based on user input.

As a non-limiting example, coupling of the grip element to the device at a first position may actuate certain actuatable elements of the device to generate actuation signals that are inputted to the control module of the device to cause the control module to initiate a sleep mode for the device and lock the device in the sleep mode. The device may then receive user input instructing the device to unlock the current sleep mode device state and power up the device.

It should be appreciated that the description above is provided purely by way of example, and that coupling of a grip element to a device in accordance with embodiments of the disclosure may result in the actuation of any actuatable elements and may cause any device characteristics to be established or modified.

In various embodiments, a plurality of different coupling positions of the grip element to the device may produce the same device functionality. For example, the control module of the device may cause a same orientation of the displayed information to be established/maintained for a plurality of different positions in which the grip element is coupled to the device. Similarly, the control module of the device may establish and/or lock the device in a particular device state for a plurality of different positions in which the grip element is coupled to the device.

A grip element in accordance with embodiments of the disclosure may have any suitable shape, size, and/or configuration. For example, the grip element may include a handle portion which may have an arcuate shape for ease of grasping by a user. In various other embodiments, the grip element may include a first surface configured to be coupled to the user device and a second opposing surface configured to be grasped by a user. The second opposing surface may include depressions or grooves for accommodating fingers and improving the ease with which the grip element is grasped. In other embodiments, an element, in accordance with embodiments of the disclosure, that is capable of being coupled to a user device and causing one or more device characteristics to be established or modified upon coupling to the device may include at least one engagement portion. The at least one engagement portion may include at least one engagement surface configured to interface with one or more external surfaces to establish one or more positions of the device. In certain embodiments, the at least one engagement portion may be capable of being grasped by a user, thereby allowing the user to manipulate a position of the device via the at least one engagement portion.

In certain embodiments, the grip element may include coupling portions provided on opposing ends of the grip element that are configured to be coupled to a device. For example, the coupling portions may include magnets that are configured to adhere to magnets provided on a user device via an attractive magnetic force there between. In other embodiments, the coupling portions may include mechanical connectors of any sort that are configured to be coupled to corresponding connecting elements provided on the user device. In various embodiments, the connecting elements provided on a user device for coupling to the grip element may correspond to the actuatable elements. In other embodiments, the connecting elements provided on the device may be separate from the actuatable elements that are actuated upon coupling of the grip element to the device. Grip elements of different sizes may be provided, each of which is capable of being coupled to the device. In certain embodiments, the grip element may have telescoping components that allow the size of the grip element to be adjusted. One of ordinary skill in the art will appreciate that the grip element may have any suitable shape or configuration.

The grip element may further include one or more user interface components capable of receiving user input. The user interface component(s) may include a touch screen panel, control buttons, or any other means by which a user may provide input to the grip element. The user input(s) provided to the grip element may be transmitted to the device via a wireless connection using Near Field Communication (NFC) standards, a personal area network established using Bluetooth® communication standards, a wireless local area network (LAN) such as, for example, Wi-Fi, and so forth. The user may provide input to the device via the user interface components to control various device functionality such as scrolling through display screens (e.g., pages of an electronic book or e-book), toggling through applications, toggling through web browser windows, and so forth.

These and other embodiments of the disclosure will be described in more detail through reference to the accompanying drawings in the detailed description that follows.

Illustrative Architecture

Figure 2A:
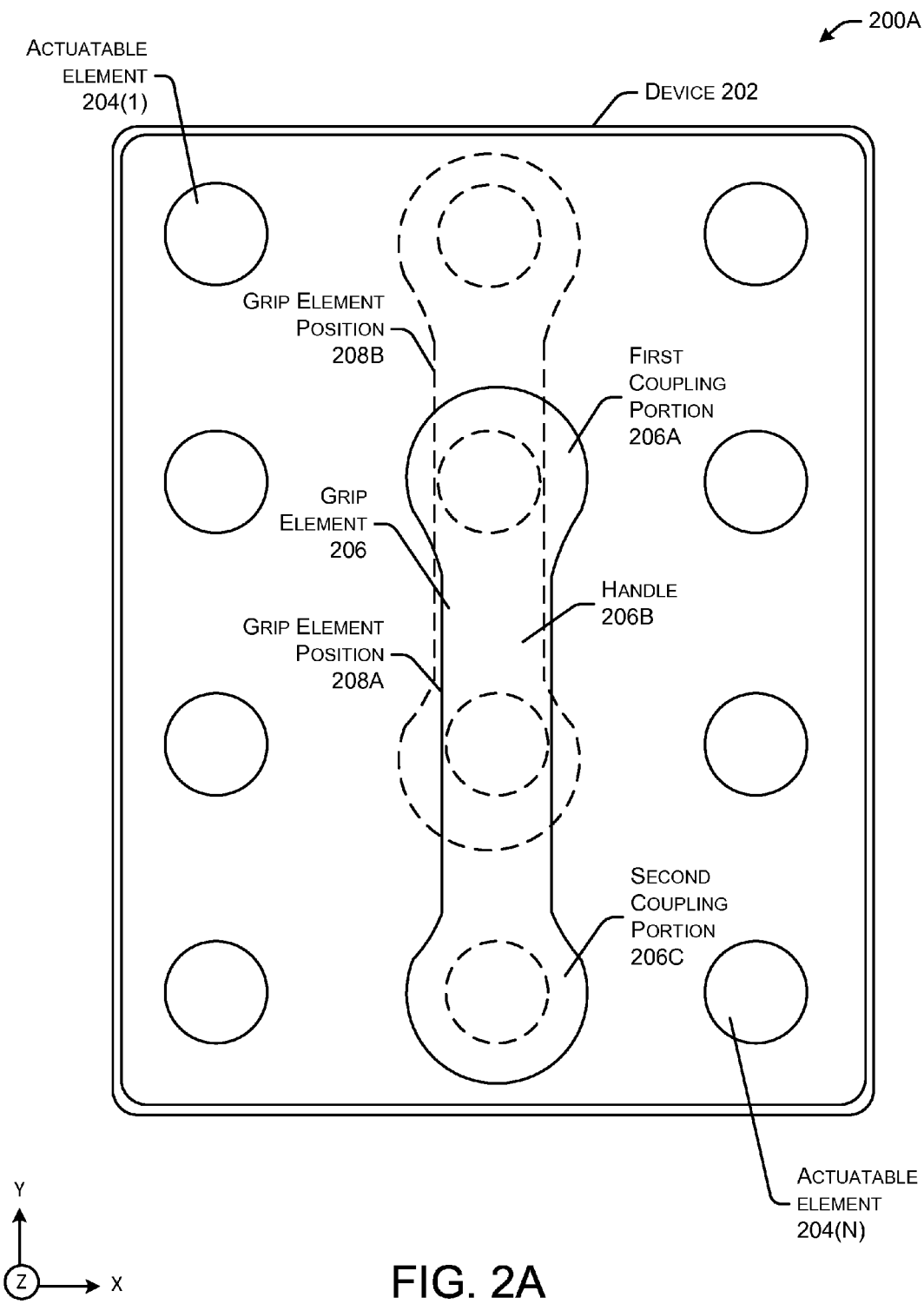
FIG. 2A schematically depicts a top view of an example user device having an example grip element coupled thereto that actuates one or more actuatable elements of the user device in accordance with one or more embodiments of the disclosure.

FIG. 2A schematically depicts a top view 200A of a back portion of an example user device 202 having an example grip element 206 coupled thereto that actuates one or more actuatable elements 204(1)-204(N) of the user device 202 in accordance with one or more embodiments of the disclosure. While the actuatable elements 204(1)-204(N) are depicted as being disposed on a back surface of the device 202, it should be appreciated that the actuatable elements 204(1)-204(N) may be disposed anywhere on the device 202. Further, while the grip element 206 is depicted as being coupled to a back surface of the device 202, it should be appreciated that the grip element may be coupled to any surface of the device 202, either to the actuatable elements 204(1)-204(N) or to other connecting or coupling components forming part of the device 202.

In FIG. 2A, the actuatable elements 204(1)-204(N) are shown as being arranged in a grid pattern; however, the actuatable elements 204(1)-204(N) may be arranged in any suitable arrangement. While only the actuatable elements 204(1) and 204(N) are labeled, it should be understood that similarly depicted components represent any of actuatable elements 204(2)-204(N-1). The actuatable elements 204(1)-204(N) may be any of the types of actuatable elements previously described including, but not limited to, mechanical actuatable elements, electrical actuatable elements, magnetic actuatable elements, or combinations thereof.

The grip element 206 may include a first coupling portion 206A, a handle portion 206B, and a second coupling portion 206C. The grip element 206 may have any suitable shape, size, or configuration. For example, in various embodiments, the grip element 206 may be any element configured to be coupled to the device 202 and may include at least one coupling portion and/or at least one engagement portion. Further, it should be appreciated that the grip element 206 may include any number of coupling portions. The coupling portions 206A, 206C may be configured to be coupled to the device 202. For example, the coupling portions 206A, 206C may be configured to be coupled to respective actuatable elements of the actuatable element(s) 204(1)-204(N).

In FIG. 2A, the grip element 206 is shown coupled to the device, or more specifically to respective ones of the actuatable elements 204(1)-204(N), in a first position 208A. The grip element 206 may be coupled to the device 202 in a particular axial direction of the device 202 (e.g., a longitudinal direction (y-direction) of the device 202). The coupling force between the grip element 206 and the actuatable elements to which it is coupled may be strong enough to retain the grip element 206 in the coupled state and weak enough to permit a user to de-couple the grip element 206 from the device 202 with relative ease. The grip element 206 may be coupled to the device 202 at different positions. For example, the grip element 206 may be coupled to the device 202 at position 208B instead. It should be appreciated that the grip element 206 may be coupled to any of the actuatable elements 204(1)-204(N) in any suitable position.

Figure 2B:
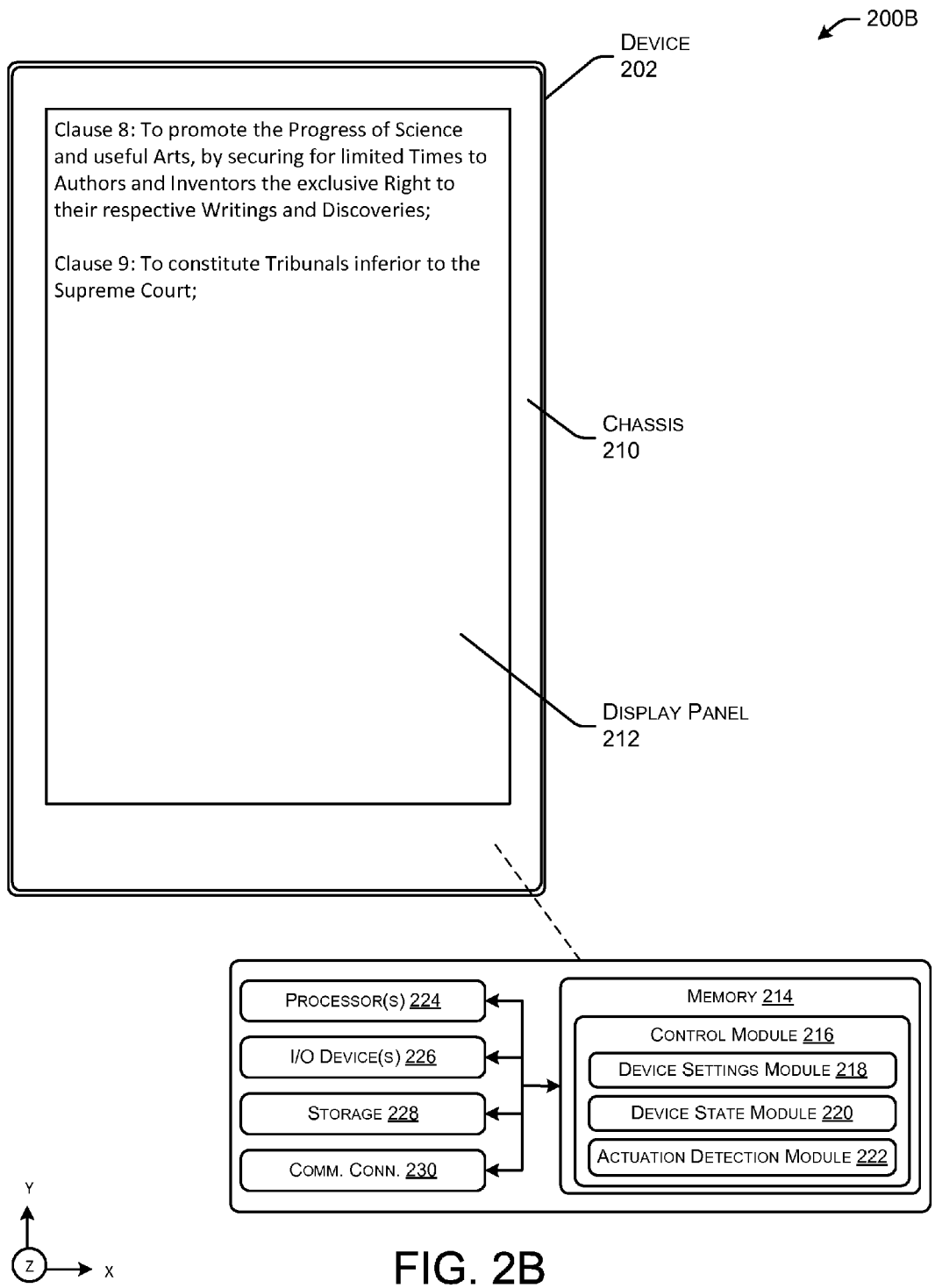
FIG. 2B schematically depicts an orientation of displayed information and device architecture for the user device depicted in FIG. 2A.

Referring now to FIGS. 2A and 2B, coupling of the grip element 206 to any of the actuatable elements 204(1)-204(N) aligned in the longitudinal direction of the device 202 (e.g., the y-axis direction) may actuate those actuatable elements, causing corresponding actuation signals to be generated. More specifically, an actuation detection module 222 provided as part of a control module 216 may include computer-executable instructions configured to be executed by one or more processors (processor(s)) 224 to detect actuation of the actuatable elements to which the grip element 206 is coupled and generate the actuation signals. The actuation signals may be provided as input to a device settings module 218 that is provided as part of the control module 216. The processor(s) 224 may execute computer-executable instructions included in the device settings module 218 to establish (and optionally lock) an orientation of information displayed via a display panel 212 in a first orientation. The display panel 212 is shown in FIG. 2B as being disposed within a chassis 210.

The first orientation of the information displayed on the display panel 212 (as shown in FIG. 2B) may correspond to an alignment of the information that is substantially perpendicular to the longitudinal direction of the device 202, and thus may further correspond to an alignment that is substantially perpendicular to an alignment of the actuatable elements to which the grip element 206 is coupled in FIG. 2A. In various embodiments, the orientation of the information displayed on the display panel 212 may be maintained in the depicted orientation regardless of the degree to which or manner in which the device 202, and hence the display panel 212, may be rotated, as long as the grip element 206 remains coupled to the device 202 in any suitable longitudinal position and any corresponding longitudinally aligned actuatable elements remain actuated. A different orientation from that shown in FIG. 2B may be established, and the orientation of the displayed information may optionally be locked to that newly established different orientation, upon de-coupling of the grip element 206 from a longitudinally aligned position (such as those shown in FIG. 2A) and re-coupling of the grip element 206 to actuatable elements that are, for example, horizontally aligned (e.g., aligned in the x-direction). While specific embodiments have been described above with respect to orientation of displayed information, it should be appreciated that numerous other device settings may be established and/or modified based on actuation of various actuatable elements in accordance with embodiments of the disclosure.

In various embodiments, coupling of the grip element 206 to a specific set of actuatable elements of the actuatable elements 204(1)-204(N) may result in an establishment or modification of a state of the device. Actuation of the specific set of actuatable elements may cause one or more actuation signals to be generated. More specifically, the processor(s) 224 may execute computer-executable instructions included in the actuation detection module 222 to detect actuation of the specific set of actuatable elements and to generate the actuation signal(s). The actuation signal(s) may then be provided as input to a device state module 220. The processor(s) 224 may execute computer-executable instructions included in the device state module 220 to establish or modify a state of the device and potentially lock the device in that state as long as the corresponding actuatable elements remain actuated or until different actuatable elements become actuated.

Purely by way of example, coupling of the grip element 206 to a top row of actuatable elements may cause the device to enter a sleep mode or power down the device. The device may optionally be locked in the established device state until, for example, the grip element 206 is de-coupled from the specific set of actuatable elements. Re-coupling of the grip element 206 to one or more different sets of actuatable elements may cause the device to wake up from sleep mode or be powered on by virtue of actuation of the different set of actuatable elements. It should be appreciated that any device state may be established and maintained based on the actuation of any of the actuatable elements 204(1)-204(N). For example, actuation of a specific set of actuatable elements by coupling the grip element 206 to those actuatable elements may instead cause the device 202 to power on or wake up from a sleep mode.

As previously noted, a user may be able to unlock a particular device setting (e.g., orientation of displayed information) or a particular device state by providing one or more inputs to the device. For example, upon unlocking of a particular orientation and/or device state based on user input, the orientation and/or device state may be determined based on, for example, a position of the device as determined by an accelerometer or user actions, respectively.

The processor(s) 224 may be implemented, as appropriate, in hardware, software, firmware, or combinations thereof. Software or firmware implementations of the processor(s) 224 may include computer-executable or machine-executable instructions written in any suitable programming language to perform various operations. Hardware implementations of the processor(s) 224 may be configured to execute computer-executable or machine-executable instructions to perform various operations.

While the device settings module 218, the device state module 220, and the actuation detection module 222 are depicted in FIG. 2B as sub-modules of the control module 216, it should be appreciated that they may be provided as independent modules in the memory 214. Further, while the control module 216 is depicted as being loaded into the memory 214, it should be appreciated that portions of the control module 216 may be implemented in hardware.

The memory 214 may store computer-executable instructions that are loadable and executable by the processor(s) 224, as well as data manipulated or generated during the execution of the computer-executable instructions. Depending on the configuration and/or type of the device 202, the memory 214 may be volatile (such as random access memory (RAM))

and/or non-volatile (such as read-only memory (ROM), flash memory, etc.). The device 202 may also include additional storage 228, which may include removable storage and/or non-removable storage. The additional storage 228 may include, but is not limited to, magnetic storage, optical disk storage, and/or tape storage. The disk drives and their associated computer-readable media may provide non-volatile storage of computer-executable instructions, data structures, program modules, and/or other data. In various implementations, the memory 214 may include multiple different forms or types of memory, such as static random access memory (SRAM), dynamic random access memory (DRAM), and/or ROM.

The memory 214 and/or the additional storage 228, both removable and non-removable, are examples of computer-readable storage media. For example, computer-readable storage media may include volatile or non-volatile and/or removable or non-removable media implemented according to any method or technology for storage of information such as computer-executable instructions, data structures, program modules, and/or other data.

The device 202 may also include communications connection(s) 230 that allow the device 202 to communicate with stored databases, other computing devices or servers, user terminals, and/or other devices across one or more public or private networks including any one or more of a combination of different types of suitable communications networks, such as cable networks, the Internet, wireless networks, cellular networks, and other private and/or public networks. The device 202 may also include input/output (I/O) device(s) 226, such as a keyboard, a mouse, a stylus, a voice input device, a touch input device, a display (such as the display panel 212 which may be a touch screen display), speakers, and so forth.

Figure 2C:
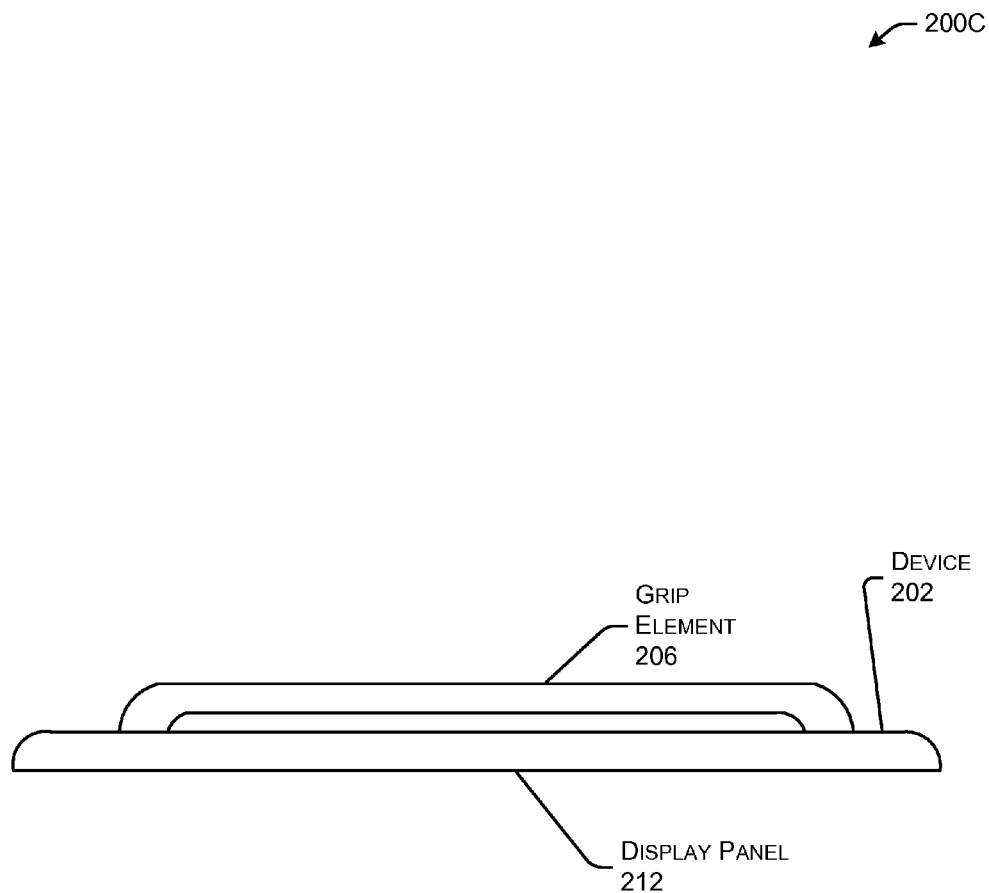
FIG. 2C schematically depicts a side view of the user device and the grip element depicted in FIG. 2A.
Figure 2C:
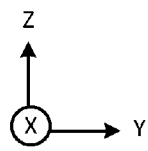

FIG. 2C schematically depicts a side view 200C of the user device and the grip element depicted in FIG. 2A. As shown, the grip element 206 is depicted as being coupled to the device 202 in a longitudinal direction of the device 202 (e.g., the y-direction). More specifically, the grip element 206 may be coupled to any longitudinally aligned actuatable elements of the actuatable elements 204(1)-204(N).

Figure 2D:
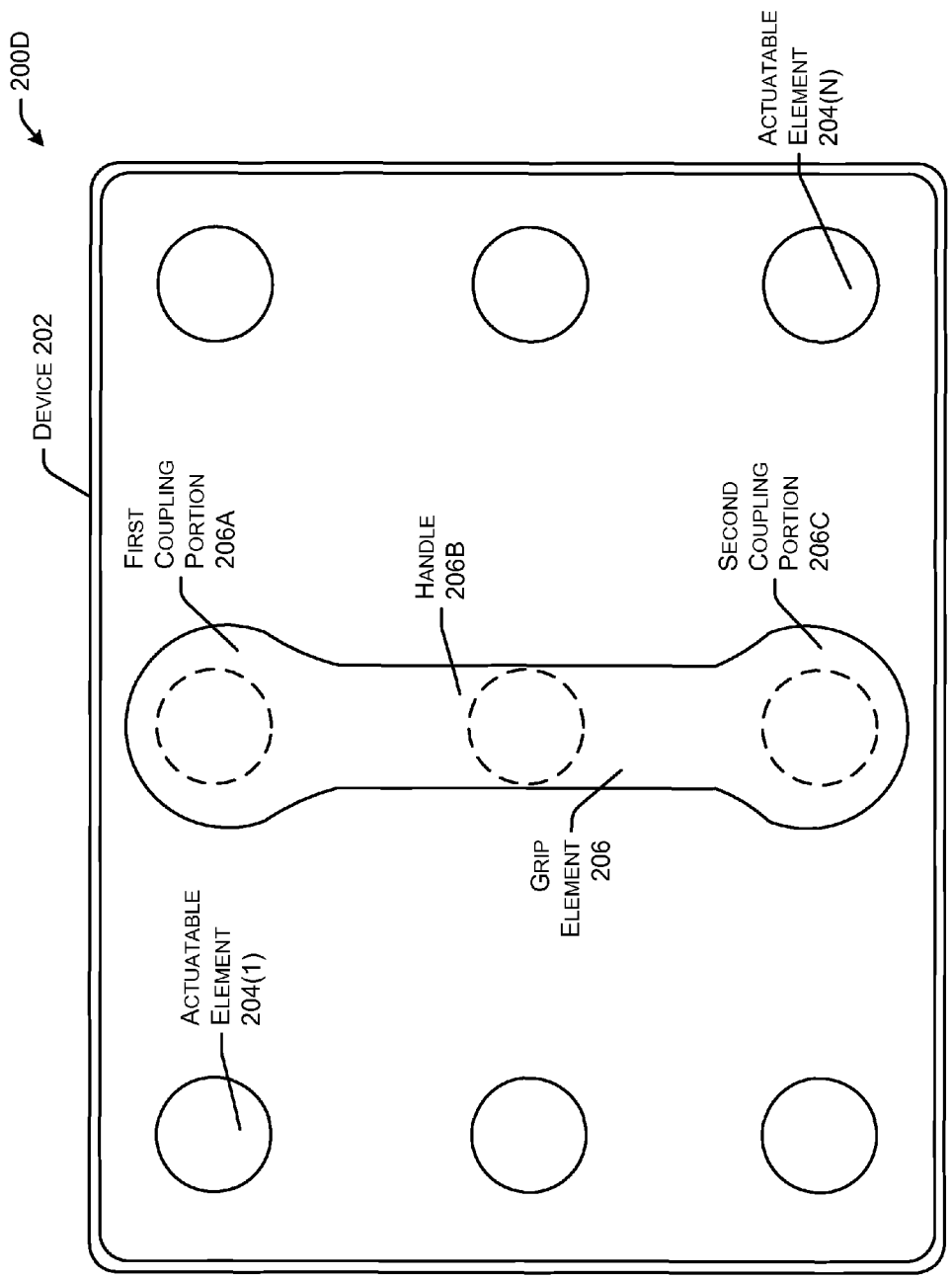
FIG. 2D schematically depicts a top view of the example user device depicted in FIG. 2A having the example grip element coupled thereto in a different position to actuate one or more different actuatable elements of the user device in accordance with one or more additional embodiments of the disclosure.

FIG. 2D schematically depicts another top view 200D of the back portion of the user device 202 with the grip element 206 coupled thereto in a different position from that depicted in FIG. 2A.

Similar to FIG. 2A, the actuatable elements 204(1)-204(N) are shown in FIG. 2D as being arranged in a grid pattern; however, the actuatable elements 204(1)-204(N) may be arranged in any suitable arrangement. Further, while only the actuatable elements 204(1) and 204(N) are labeled, it should be understood that similarly depicted components represent any of actuatable elements 204(2)-204(N-1). Although a different number of actuatable elements are shown in FIG. 2D as compared to FIG. 2A, it should be appreciated that FIG. 2A and FIG. 2D may depict the same device 202, and thus a same number of actuatable elements 204(1)-204(N) may be present. As previously noted, the actuatable elements 204(1)-204(N) may be any of the types of actuatable elements previously described including, but not limited to, mechanical actuatable elements, electrical actuatable elements, magnetic actuatable elements, or combinations thereof.

In FIG. 2D, the grip element 206 is shown coupled to the device 202, or more specifically, to respective ones of the actuatable elements 204(1)-204(N) such that the grip element 206 extends in an axial direction (e.g., an x-direction) of the device 202 that may be substantially perpendicular to the longitudinal direction in which the grip element 206 is shown as extending in FIG. 2A. As previously noted, the coupling force between the grip element 206 and the actuatable elements to which it is coupled may be strong enough to retain the grip element 206 in the coupled state and weak enough to permit a user to de-couple the grip element 206 from the device 202 with relative ease.

Figure 2E:
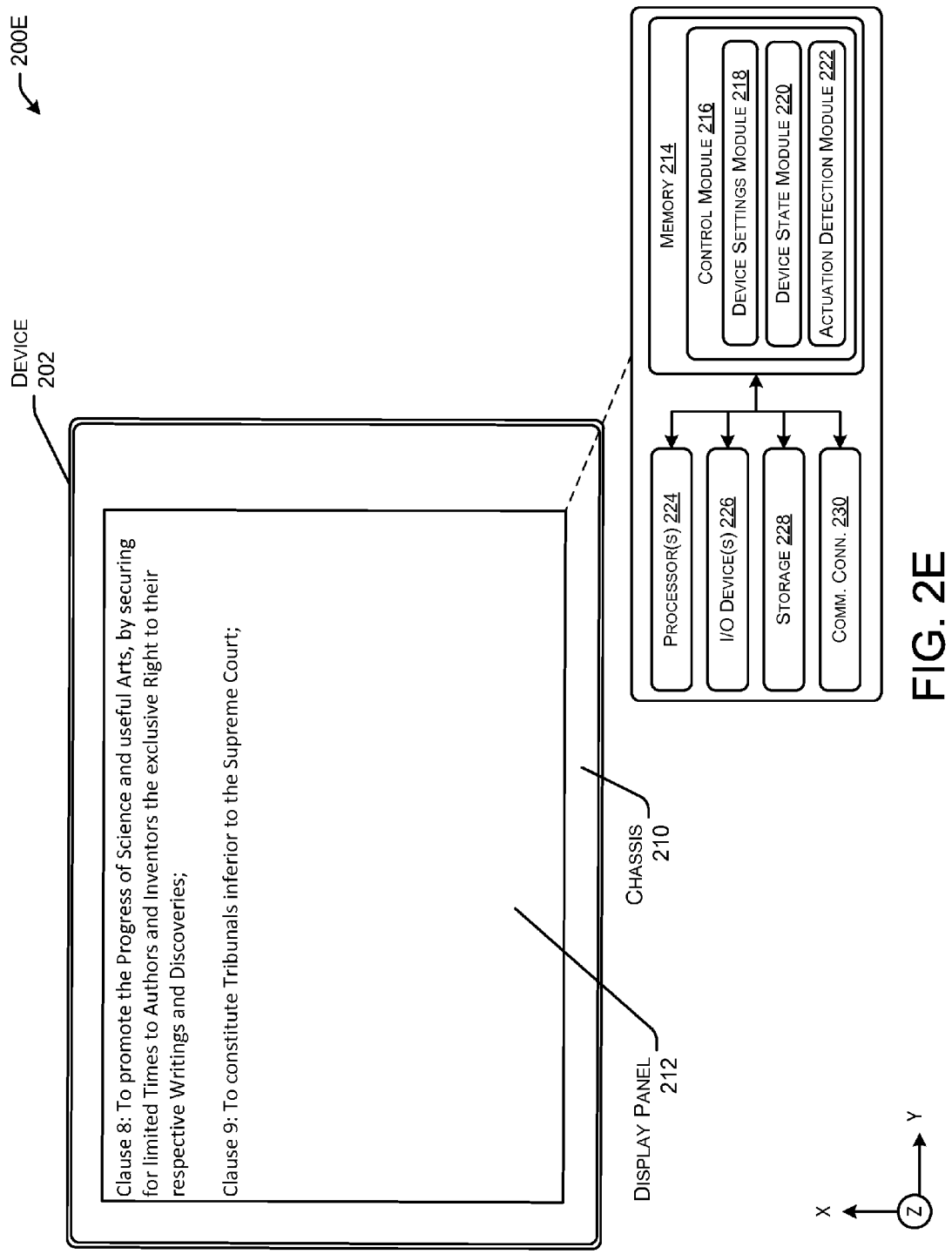
FIG. 2E schematically depicts an orientation of displayed information and device architecture for the user device depicted in FIG. 2D.

Referring now to FIGS. 2D and 2E, coupling of the grip element 206 to any of the actuatable elements 204(1)-204(N) aligned in the horizontal direction of the device 202 (e.g., the x-axis direction) may actuate those actuatable elements, causing corresponding actuation signals to be generated. More specifically, the actuation detection module 222 may include computer-executable instructions configured to be executed by the processor(s) 224 to detect actuation of the actuatable elements to which the grip element 206 is coupled and to generate the actuation signals. The actuation signals may be provided as input to the device settings module 218. The processor(s) 224 may execute computer-executable instructions included in the device settings module 218 to establish (and optionally lock) an orientation of information displayed via the display panel 212 in a second orientation.

The second orientation of the displayed information may be different from the first orientation of the displayed information described through reference to FIG. 2B. More specifically, the second orientation may correspond to an alignment of the information that is substantially parallel to the longitudinal direction of the device 202 (e.g., the y-direction), and thus may further correspond to an alignment that is substantially perpendicular to an alignment of the actuatable elements to which the grip element 206 is coupled in FIG. 2D. In various embodiments, the orientation of the information displayed on the display panel 212 may be locked in the second orientation regardless of the degree to which and the manner in which the device 202, and hence the display panel 212, may be rotated or positioned, as long as the grip element 206 remains coupled to the device 202 in any suitable horizontal position and corresponding horizontally aligned actuatable elements remain actuated. A different orientation from that shown in FIG. 2D may be established, and the orientation of the displayed information may optionally be subsequently locked to that newly established different orientation, upon de-coupling of the grip element 206 from a horizontally aligned position and re-coupling of the grip element 206 to actuatable elements that are, for example, longitudinally aligned (e.g., aligned in the y-direction).

As previously noted through reference to FIGS. 2A-2C, according to certain embodiments, coupling of the grip element 206 to longitudinally aligned actuatable elements of the actuatable elements 204(1)-204(N) may cause the device 202 (or more specifically the control module 216) to lock the orientation of information displayed on the display panel 212 in a first orientation. The displayed information may be locked in the first orientation as long as the corresponding longitudinally aligned actuatable elements remain actuated regardless of rotation or positioning of the device 202. De-coupling the grip element 206 from the device 202 may unlock the orientation of the displayed information. If the grip element 206 remains de-coupled from the device 202, the orientation of the displayed information may be governed by other device mechanisms such as an accelerometer. However, if the grip element 206 is subsequently coupled to various horizontally aligned actuatable elements of the actuatable elements 204(1)-204(N), the control module 216 may establish a second orientation for the displayed information and may lock the displayed information in the second orientation as long as the grip element 206 is coupled to the horizontally aligned actuatable elements and such actuatable elements remain actuated. However, it should be noted that while a particular orientation of the displayed information may be established based on a position at which the grip element 206 is coupled to the device 202, in certain embodiments, the control module 216 may not lock the orientation of the displayed orientation in the established orientation.

Figure 2F:
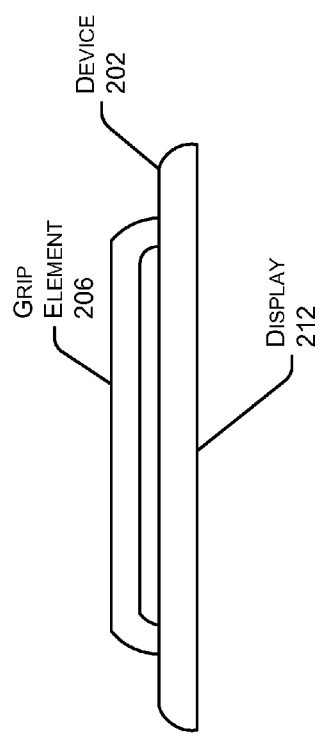
FIG. 2F schematically depicts a side view of the user device and the grip element depicted in FIG. 2D.
Figure 2F:
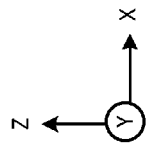

FIG. 2F schematically depicts a side view 200F of the user device and the grip element depicted in FIG. 2D. As shown, the grip element 206 is depicted as being coupled to the device 202 in a horizontal direction of the device 202 (e.g., the x-direction). More specifically, the grip element 206 may be coupled to any horizontally aligned actuatable elements of the actuatable elements 204(1)-204(N).

Figure 3:
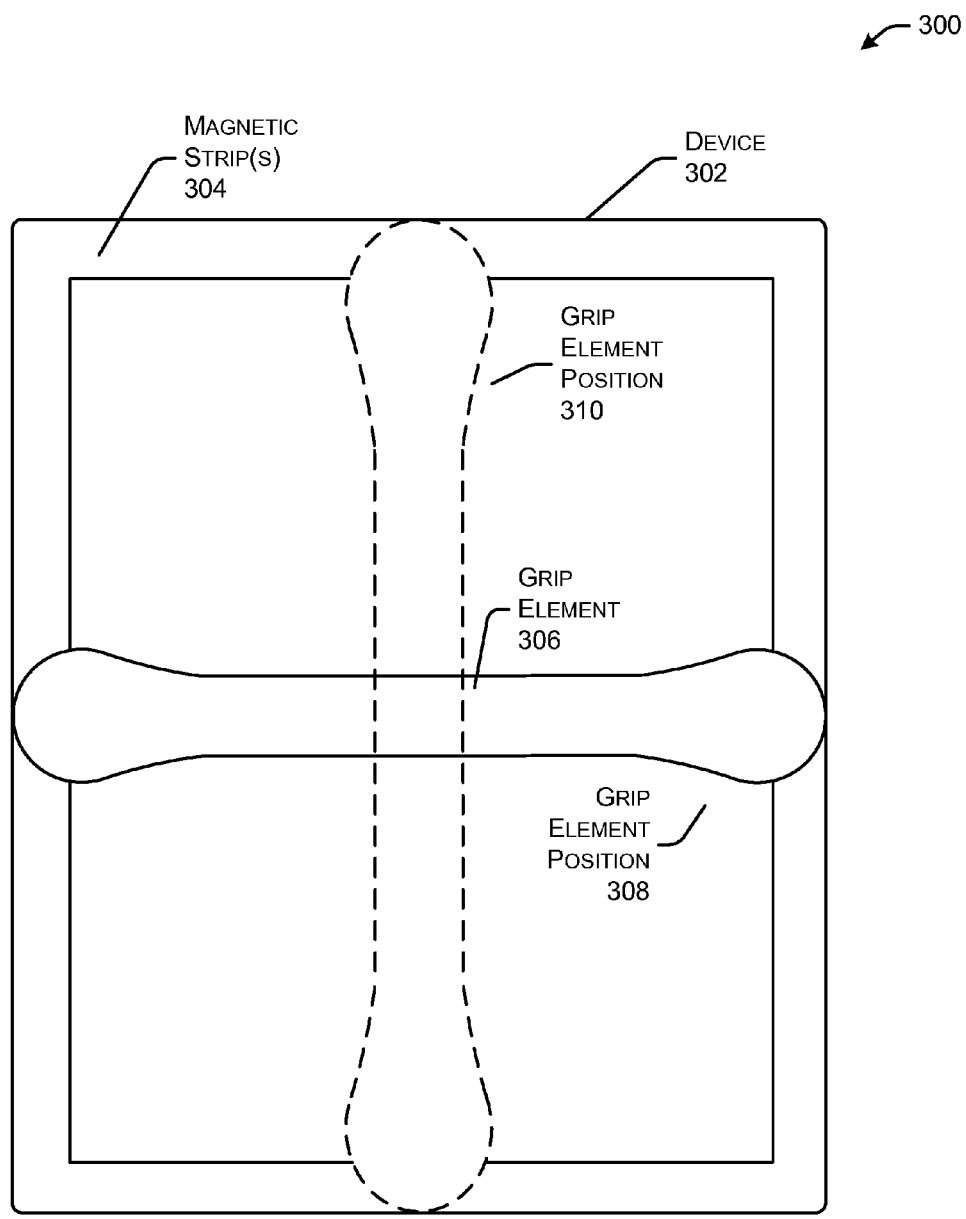
FIG. 3 schematically depicts a top view of an example user device illustrating example coupling positions for coupling an example grip element to the user device and associated example actuatable elements in accordance with one or more alternate embodiments of the disclosure.

FIG. 3 schematically depicts a top view 300 of an example user device 302 illustrating example coupling positions for coupling an example grip element 306 to the user device 302 in accordance with one or more alternate embodiments of the disclosure. The device 302 may correspond in various respects to the device 202. However, the device 302 may include one or more magnetic strips 304 as the actuatable elements. The magnetic strips or bars 304 may be disposed along edge portions of the back surface of the device 302. However, it should be appreciated that the magnetic strips or bars 304 may be disposed on any surface of the device 302. Further, the grip element 306 may have any suitable shape, size, or configuration, and may, in certain embodiments, be similar to the grip element 206.

The grip element 306 may be configured to be coupled to the magnetic strips or bars 304. More specifically, end portions of the grip element 306 may include magnets that adhere to the magnetic strips or bars 304 via a magnetic force of attraction there between. The magnetic force between the grip element 306 and the magnetic strips or bars 304 may be strong enough to retain the grip element 306 in a coupled state with respect to the device 302 and prevent the grip element 306 from de-coupling due to gravitational forces, but may be weak enough to permit a user to remove the grip element 306 from the device 302 with ease. While two grip element coupling positions 308, 310 are shown, it should be appreciated that the grip element 306 may be coupled to the magnetic strips or bars anywhere along the length of the longitudinally aligned magnetic strips or bars (e.g., those aligned in the y-direction) or anywhere along the length of the horizontally aligned magnetic strips or bars (e.g., those aligned in the x-direction).

Coupling of the grip element 306 to the magnetic strips 304 that are horizontally aligned may, for example, actuate the magnetic strips and cause the control module to establish a first orientation for the displayed information, similar to the coupling positions described through reference to FIGS. 2A-2C. In contrast, coupling of the grip element 306 to the magnetic strips 304 that are longitudinally aligned may, for example, actuate the magnetic strips and cause the control module to establish the second orientation for the displayed information, similar to the coupling positions described through reference to FIGS. 2D-2F. Coupling of the grip element 306 to the magnetic strips 304 may, in other embodiments, cause the control module to establish one or more other device settings and potentially lock the device in the established device settings.

In one or more additional embodiments of the disclosure, coupling of the grip element 306 to specific positions of the horizontally aligned magnetic strips 304 and/or the longitudinally aligned magnetic strips 304 may actuate the magnetic strips, thereby generating actuation signal(s) that are provided as input to the control module to cause the control module to establish a state of the device, and further, to potentially lock the device in the established state. For example, coupling the grip element 306 to the longitudinally aligned magnetic strips or the horizontally aligned magnetic strips at specific position(s) may cause the control module to initiate a sleep mode for the device, power the device down, wake the device from a sleep mode, power the device up, and so forth. Optionally, the device may then be locked in the established device state as long as the grip element 306 remains coupled to the device 302 at those specific position(s). De-coupling of the grip element 306 may unlock the device state. Alternatively, the device state may be unlocked based on an input provided by a user of the device 302 even if the grip element 306 remains coupled to the device 302 at those specific position(s).

Figure 4:
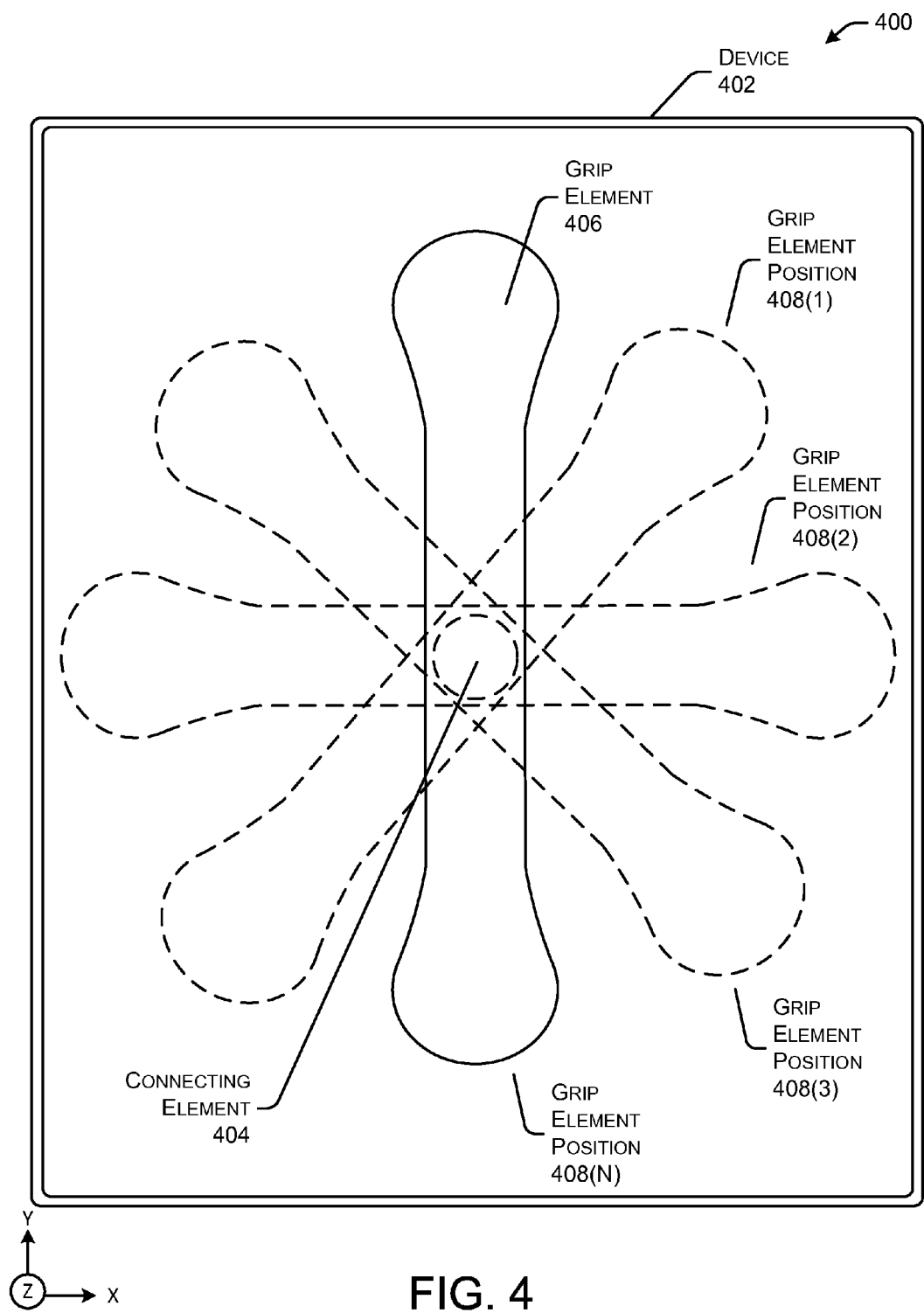
FIG. 4 schematically depicts a top view of an example user device illustrating example grip element positions in accordance with one or more alternate embodiments of the disclosure.

FIG. 4 schematically depicts a top view 400 of an example user device 402 illustrating example positions of an example grip element 406 coupled to the device 402 in accordance with one or more alternate embodiments of the disclosure. The device may correspond in various respects to device 202 and/or device 302.

The grip element 406 may be configured to be coupled to a connecting element 404 that forms part of the device 402. More specifically, the grip element 406 may include one or more components configured to couple to the connecting element 404. The coupling between the grip element 406 and the connecting element 404 may be a mechanical coupling (e.g., a snap-fit connection, a mating groove connection, etc.), a magnetic coupling, and so forth. The connecting element 404 may further constitute an actuatable element which may correspond to any of the actuatable elements previously described.

The grip element 406 may be coupled to the connecting element 404 so as to be rotatable between a plurality of grip positions 408(1)-408(N). The device 402 may be configured to detect which grip position of the grip positions 408(1)-408(N) that grip element 406 is currently in and establish (and potentially lock) displayed information in a corresponding orientation, establish (and potentially lock) the device in a particular device state, and so forth. For example, each of the grip positions 408(1)-408(N) may actuate a different actuatable element which may be detectable by a control module of the device 402. Alternatively, upon coupling of the grip element 406 to the device 402, a position of the grip element 406 may be determined by, for example, an accelerometer of the device 402 in order to establish a corresponding orientation of displayed information and/or a corresponding device state.

Figure 5:
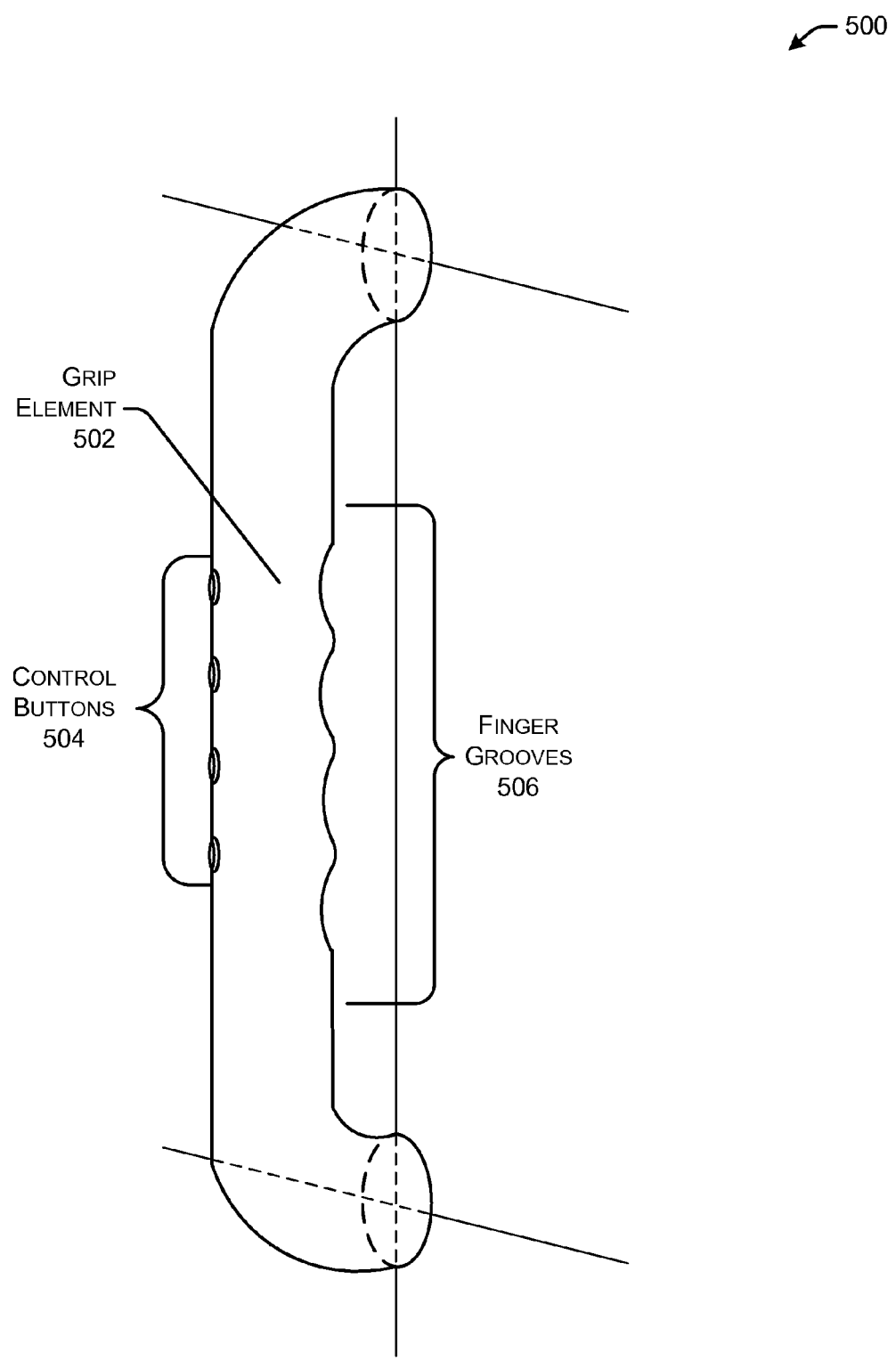
FIG. 5 schematically depicts an example grip element in accordance with one or more embodiments of the disclosure.

FIG. 5 schematically depicts an example configuration 500 of an example grip element 502 in accordance with one or more embodiments of the disclosure. The grip element 502 may include one or more user interface components 504 capable of receiving user input. The user interface component(s) may include a touch screen panel, control buttons, or any other means by which a user may provide input to the grip element 502. The user input(s) provided to the grip element 502 may be transmitted to a device to which the grip element 502 is coupled via a wireless connection using NFC standards, a personal area network established using Bluetooth® communication standards, a wireless local area network (LAN) using, for example, Wi-Fi, and so forth. The user may provide input to the device via the user interface components 504 to control various device functionality such as scrolling through display screens (e.g., pages of an electronic book or e-book), toggling through applications, toggling through web browser windows, and so forth. The grip element 502 is further shown as having indentations or grooves 506 formed therein for receiving fingers of a user's hand in order to improve the ease with which the grip element 502 may be handled.

Figure 6A:
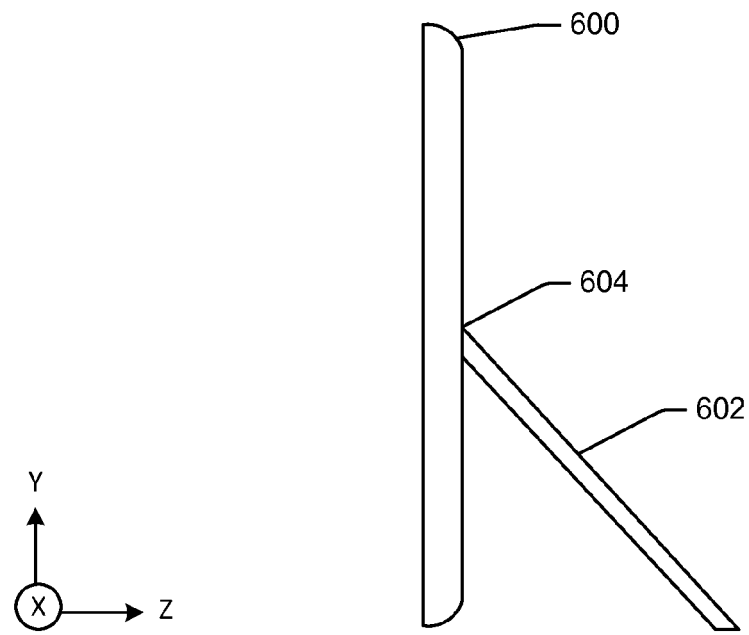
FIGS. 6A-6B schematically depict an example element coupled to an example user device at various positions in accordance with one or more embodiments of the disclosure.
Figure 6B:
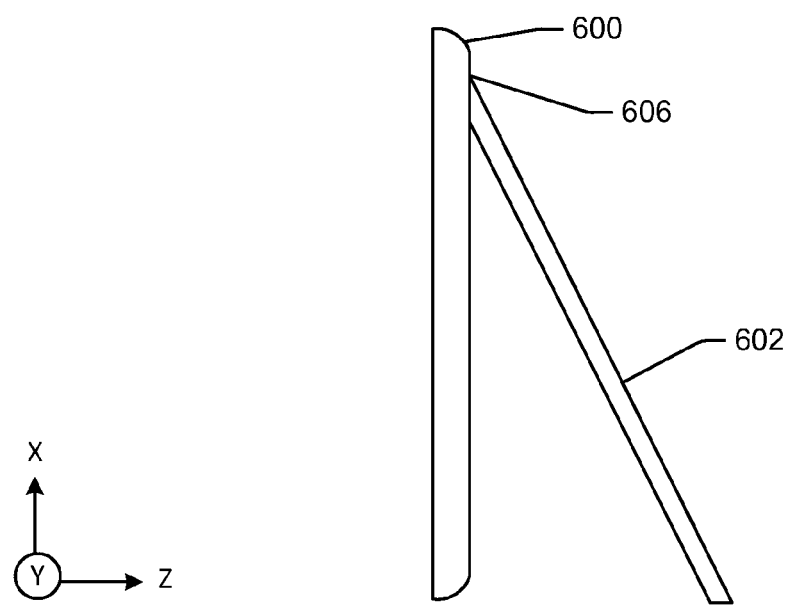

FIGS. 6A-6B schematically depict an example element coupled to an example user device at various positions in accordance with one or more embodiments of the disclosure. Referring to FIG. 6A, an example user device 600 is shown. An element 602 is coupled to the user device 600 at a coupling position 604. It should be appreciated that the element 602 may be coupled to the user device 600 at more than one coupling position 604. The element may include an engagement surface 608 capable of interfacing with an external surface to establish a position of the device 600.

FIG. 6B schematically depicts the device 600 positioned in a different position from the position of the device depicted in FIG. 6A. For example, the device 600 schematically depicted in FIG. 6B may be positioned such that a first edge of the device 600 rests on an external surface, while the device 600 schematically depicted in FIG. 6A may be positioned such that a second edge perpendicular to the first edge is resting on the external surface. The element 602 is depicted in FIG. 6B as being coupled to the device 600 at one or more coupling positions 606 that are different from the one or more coupling positions 604 depicted in FIG. 6A. Similar to FIG. 6A, the at least one engagement surface 610 is depicted in FIG. 6B as interfacing with the external surface to establish the position of the device 600.

According to one or more embodiments, coupling of the element 602 to the device 600 at the coupling position(s) 604 may cause a control module of the device 600 to establish a device state or one or more device settings. The device 600 may optionally be locked in the established device state or with the established device setting(s) as long as the element 602 remains coupled to the device 600 in the coupling position(s) 604. Similarly, coupling of the element 602 to the device 600 at the coupling position(s) 606 may cause a control module of the device 600 to establish a corresponding device state or one or more corresponding device settings. The device 600 may optionally be locked in the established device state or with the established device setting(s) as long as the element 602 remains coupled to the device 600 in the coupling position(s) 606.

Figure 7A:
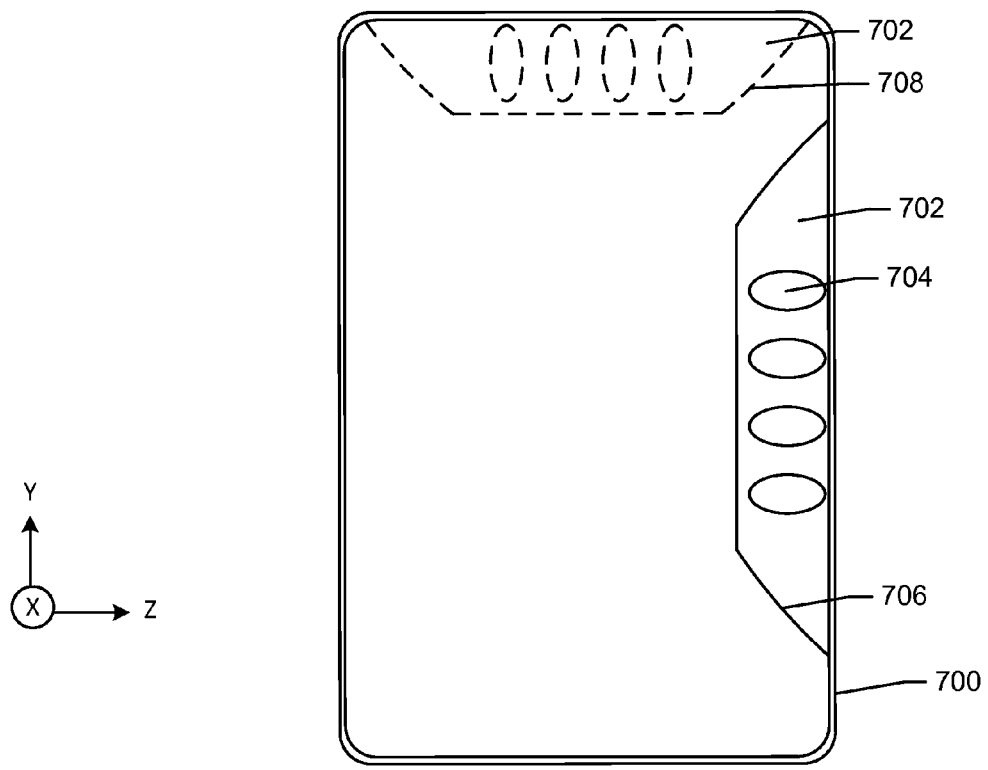
FIGS. 7A-7C schematically depict various views of an example grip element in accordance with one or more alternate embodiments of the disclosure.
Figure 7B:
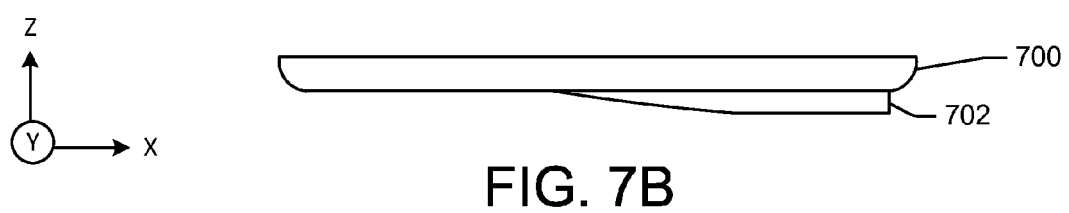
Figure 7C:

FIGS. 7A-7C schematically depict various views of an example grip element in accordance with one or more alternate embodiments of the disclosure.

FIG. 7A depicts an example grip element 702 in accordance with one or more alternate embodiments of the disclosure. The grip element 702 is shown coupled to an example device 700 in a first position 706. The grip element 702 may optionally be positioned in a second position 708. It should be appreciated that numerous other coupling positions are possible. The example grip element 702 may also optionally include depressions or grooves 704 formed therein for improving the ease with which a user may grasp the grip element 702.

In accordance with various embodiments of the disclosure, positioning of the grip element 702 in the coupling position 706 may cause a control module of the device 700 to establish a particular device setting(s) or device state. Positioning of the grip element 702 in the coupling position 708 may cause the control module to establish a different device setting(s) or device state. The device 700 may optionally be locked in the established device state or locked with the established device settings as long as the grip element 702 remains coupled in the corresponding coupling position. As described in detail throughout this disclosure, coupling of the grip element 702 to the device at a particular coupling position may actuate one or more actuatable elements provided in connection with the device, thereby generating one or more actuation signals, based on which the control module may establish corresponding device setting(s) or a device state.

FIGS. 7B and 7C depict various side views of the grip element 702 coupled to the device 700. In the side view schematically depicted in FIG. 7B, the grip element 702 is coupled to the device 700 in coupling position 706 and in the side view schematically depicted in FIG. 7C, the grip element 702 is coupled to the device 700 in coupling position 708.

Illustrative Processes

Figure 8:
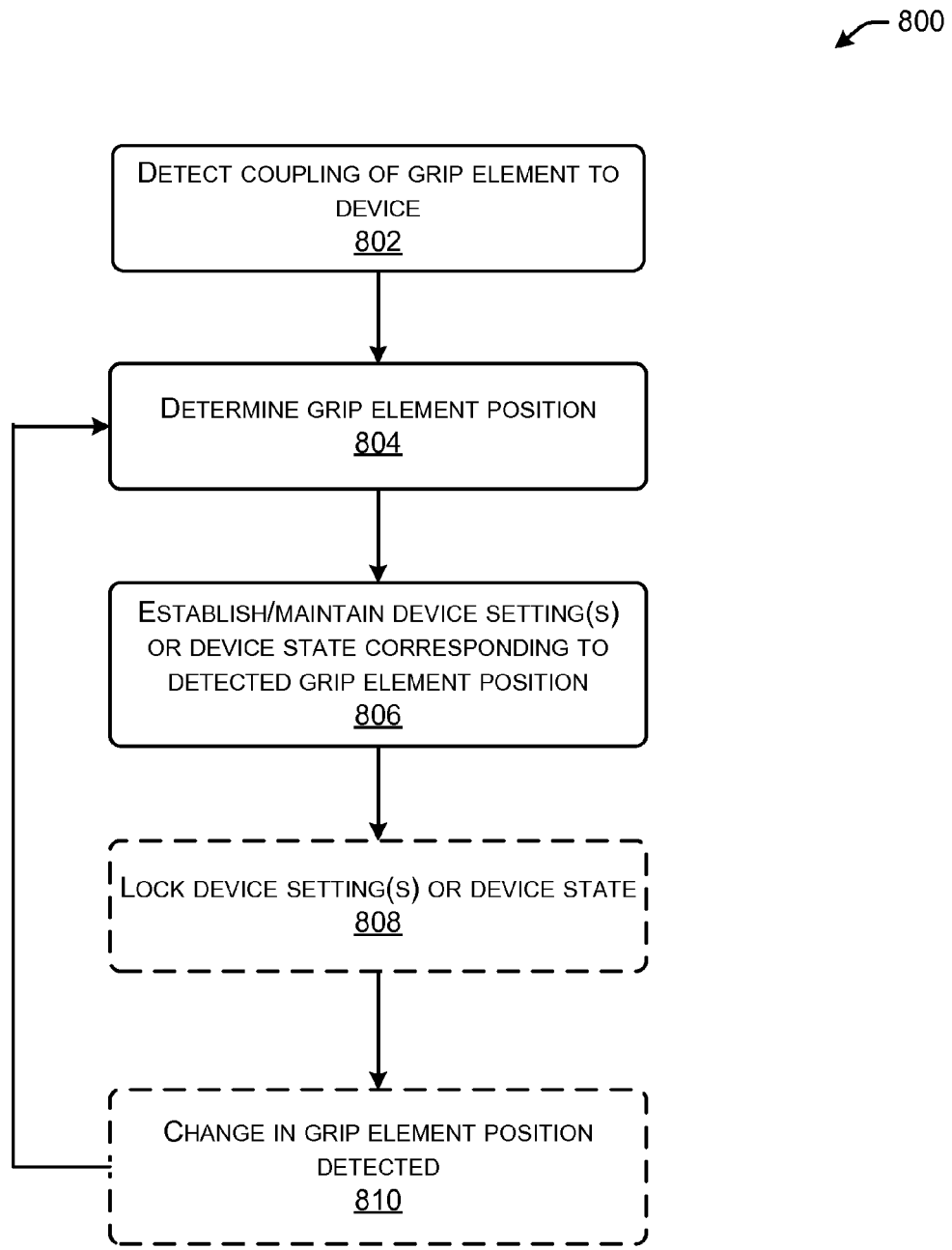
FIG. 8 is a flow diagram depicting an illustrative method for modifying one or more user device characteristics based on detected actuation of actuatable element(s) of a user device in accordance with one or more embodiments of the disclosure.

FIG. 8 is a flow diagram depicting an illustrative method 800 for establishing or modifying one or more device characteristics based on the detected actuation of actuatable element(s) of an example user device in accordance with one or more embodiments of the disclosure.

At block 802, a grip element may be detected as being coupled to a device. More specifically, actuation of one or more actuatable elements of the device may be detected. The one or more actuatable elements may be actuated as a result of coupling of the grip element to the device. Actuation of the one or more actuation elements may be detected by, for example, execution of computer-executable instructions included in the actuation detection module 222.

Upon detection of actuation of one or more actuatable elements at block 802, a position of the grip element may be determined at block 804. The position of the grip element may be determined based at least in part on which actuatable elements are currently actuated. At block 806, one or more device settings (e.g., an orientation of information displayed by the device) or a device state may be established based at least in part on the detected grip element position. For example, if it is determined that actuatable elements aligned in a longitudinal direction of the device are actuated, it may be concluded that the grip element is coupled to the device so as to extend in the longitudinal direction, and the first orientation of the displayed information may be established (as described through reference to FIGS. 2A-2C). In another example, if it is determined that actuatable elements aligned in a horizontal direction of the device are actuated, it may be concluded that the grip element is coupled to the device so as to extend in the horizontal direction, and the second orientation of the displayed information may be established (as described through reference to FIGS. 2D-2F). In yet another example, if it is determined that a specific combination of actuatable elements is actuated, a specific device state may be established (e.g., sleep mode, wake up from sleep mode, powered down, powered up, etc.). The specific combination of actuatable elements may include actuatable elements that are longitudinally aligned or horizontally aligned or actuatable elements having any suitable arrangement capable of being actuated by a grip element coupled to the device.

After the corresponding device setting(s) and/or device state is established at block 806, the device may optionally lock the device in the established device settings or in the established device state at block 808. At optional block 810, a change in the position of the grip element may be detected. More specifically, actuation of one or more actuatable elements that were previously not actuated may be detected. Upon the detection of newly actuated actuatable elements at block 810, the process flow 800 may again proceed to block 804 and the grip element position may be determined. More specifically, a determination may be made as to which actuatable elements have been actuated.

If the newly actuated actuatable elements correspond to a different device setting (e.g., a different orientation of the displayed information) and/or a different device state than the current device setting or the current device state, the current device setting and/or device state may optionally be unlocked (if previously locked at block 808), and the new device setting and/or device state may be established at block 806. If, on the other hand, the newly actuated actuatable elements do not correspond to a different device setting (e.g., orientation of the displayed information) and/or a different device state than the current device setting or the current device state, the current setting and/or the current device state may be maintained at block 806. The process flow 800 may then proceed to block 808 as previously described.

While the process flow of FIG. 8 has been described with respect to specific process elements, it should appreciated that, in various embodiments, some of the process elements may be absent, and in other embodiments, one or more additional process elements may be present.

Although specific embodiments of the disclosure have been described, one of ordinary skill in the art will recognize that numerous other modifications and alternative embodiments are within the scope of the disclosure. For example, any of the functionality and/or process capabilities described with respect to a particular device or component may be performed by any other device or component. Further, while specific device characteristics have been described (e.g., orientation of displayed information, device state(s), etc.), it should be appreciated that embodiments of the disclosure may relate to numerous other device characteristics. Further, while embodiments of the disclosure have been described with respect to specific grip element positions and the corresponding actuation of specific groupings of actuatable elements, it will be appreciated that numerous other grip element positions and corresponding groups of actuatable elements are within the scope of this disclosure. Still further, while embodiments of the disclosure have been described with respect to specific types or configurations of actuatable elements and/or grip elements, it should appreciated that numerous other types and configurations of actuatable elements and/or grip elements are within the scope of this disclosure.

Additional types of computer storage media that may be present in any of the components described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the desired information and which can be accessed by the computing devices of FIG. 1. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A device, comprising:
a display panel configured to display information;
a plurality of actuatable elements comprising a first group of actuatable elements and a second group of actuatable elements, wherein the first group of actuatable elements includes at least one actuatable element not included in the second group of actuatable elements, and wherein the first group of actuatable elements are configured to be actuated upon coupling of a group of coupling portions of a graspable apparatus to the first group of actuatable elements and the second group of actuatable elements are configured to be actuated upon coupling of the group of coupling portions of the graspable apparatus to the second group of actuatable elements; and
a control module configured to:
determine that the device is oriented in a first spatial position,
detect coupling of the group of coupling portions to the first group of actuatable elements,
cause the information to be displayed in a first orientation,
determine that the device is oriented in a second spatial position different from the first spatial position,
determine that the group of coupling portions remain coupled to the first group of actuatable elements while the device is in the second spatial position,
cause the information to continue to be displayed in the first orientation,
detect de-coupling of the group of coupling portions from the first group of actuatable elements,
detect coupling of the group of coupling portions to the second group of actuatable elements, and
cause the information to be displayed in a second orientation that is different from the first orientation.

2. The device of claim 1, wherein the second spatial position is obtained by rotating the device from the first spatial position along an axis of rotation by more than a threshold angle.

3. The device of claim 2, wherein the control module is further configured to:
determine that the device is oriented in a third spatial position different from the second spatial position;
determine that the group of coupling portions remain coupled to the second group of actuatable elements while the device is in the third spatial position; and
cause the information to continue to be displayed in the second orientation.

4. The device of claim 1, wherein the each of the first group of actuatable elements and the second group of actuatable elements comprises a respective at least one of: a mechanical actuatable element, a magnetic actuatable element, an electrical actuatable element, or any combination thereof.

5. A device, comprising:
a display panel configured to display information;
a first group of one or more actuatable elements configured to be actuated upon being coupled to at least one coupling portion of a grip apparatus and a second group of one or more actuatable elements configured to be actuated upon being coupled to the at least one coupling portion; and
a control module configured to:
determine that the device is oriented in a first spatial position;
detect coupling of the at least one coupling portion to the first group of one or more actuatable elements,
cause a first device characteristic of the device to be established,
determine that the device is oriented in a second spatial position different from the first spatial position,
determine that the at least one coupling portion remains coupled to the first group of one or more actuatable elements while the device is in the second spatial position,
cause the first device characteristic to be maintained,
detect de-coupling of the at least one coupling portion from the first group of one or more actuatable elements,
detect coupling of the at least one coupling portion to the second group of one or more actuatable elements, and
cause the first device characteristic to be modified to a second device characteristic that is different from the first device characteristic.

6. The device of claim 5, wherein the first device characteristic is a first device state or a first device setting and the second device characteristic is a second device state or a second device setting.

7. The device of claim 6, wherein the control module is further configured to:
detect a user input, and
cause the second device characteristic to be modified to a third device characteristic that is different from the second device characteristic based at least in part on the second spatial position of the device.

8. The device of claim 5, wherein the first device characteristic is a first device state corresponding to a sleep state for the device or a powered-down state for the device and the second device characteristic is a second device state in which the device is woken up from the sleep state or powered-up from the powered-down state.

9. The device of claim 5, wherein the control module is further configured to:
cause the second device characteristic to be maintained for a duration of actuation of the second group of one or more actuatable elements.

10. The device of claim 5, wherein the first group of one or more actuatable elements comprises a first group of one or more magnets and the second group of one or more actuatable elements comprises a second group of one or more magnets, and wherein at least one magnet in the first group is not included in the second group.

11. The device of claim 5, wherein at least one of the first group of one or more actuatable elements or the second group of one or more actuatable elements is electrically coupled to the control module.

12. The device of claim 5, wherein the at least one coupling portion is coupled to the device, and wherein the grip apparatus further comprises at least one engagement portion that facilitates establishment of the first spatial position and the second spatial position upon engagement of the at least one engagement portion.

13. The device of claim 12, wherein the at least one engagement portion comprises a graspable portion for grasping the grip apparatus.

14. The device of claim 12, wherein the at least one engagement portion comprises an engagement surface, and wherein establishment of the first spatial position and the second spatial position are facilitated upon engagement of the engagement surface by one or more external surfaces.

15. A grip apparatus, comprising:
one or more coupling portions configured to be coupled to a first group of one or more actuatable elements of a device and a second group of one or more actuatable elements of the device; and
at least one engagement portion that facilitates establishment of a plurality of device positions of the device upon i) coupling of the one or more coupling portions to the first group of one or more actuatable elements or the second group of one or more actuatable elements and ii) engagement of the at least one engagement portion,
wherein coupling of the one or more coupling portions to the first group of one or more actuatable elements causes a control module of the device to establish a first device characteristic and de-coupling of the one or more coupling portions from the first group of one or more actuatable elements and coupling of the one or more coupling portions to the second group of one or more actuatable elements causes the control module to modify the first device characteristic to a second device characteristic that is different from the first device characteristic, and
wherein the first device characteristic is fixed in the plurality of device positions while the one or more coupling portions are coupled to the first group of one or more actuatable elements and the second device characteristic is fixed in the plurality of device positions while the one or more coupling portions are coupled to the second group of one or more actuatable elements.

16. The grip apparatus of claim 15, wherein:
the first device characteristic is a first orientation of information displayed via a display panel of the device, and
coupling of the one or more coupling portions to the first group of the one or more actuatable elements in a first position in relation to the device generates a first set of one or more signals based at least in part on which the control module causes the information to be displayed in the first orientation via the display panel.

17. The grip apparatus of claim 16, wherein the second device characteristic is a second orientation of information displayed via the display panel and coupling of the one or more coupling portions to the second group of the one or more actuatable elements in a second position in relation to the device generates a second group of one or more signals based at least in part on which the control module causes the information to be displayed in the second orientation via the display panel.

18. The grip apparatus of claim 15, wherein the device characteristic is a first device state, and coupling of the one or more coupling portions to the first group of one or more actuatable elements in a first position in relation to the device generates a first set of one or more signals based at least in part on which the control module causes the first device state to be established.

19. The grip apparatus of claim 18, wherein the second device characteristic is a second device state, and coupling of the one or more coupling portions to the second group of one or more actuatable elements at a second position in relation to the device generates a second set of one or more signals based at least in part on which the control module causes the first device state to be modified to the second device state.

20. The grip apparatus of claim 15, wherein the one or more coupling portions comprise at least one of: a magnet or a mechanical connector.

21. The grip apparatus of claim 15, wherein the at least one engagement portion comprises a graspable portion for grasping the grip apparatus.

22. The grip apparatus of claim 15, wherein the at least one engagement portion comprises an engagement surface, and wherein engagement of the engagement surface by one or more external surfaces facilitates establishment of the plurality of device positions.

23. The grip apparatus of claim 15, further comprising:
one or more user interface components configured to receive input from a user and generate one or more signals provided to the control module to cause corresponding device functions to be established.

24. An apparatus comprising:
an electronic device; and
a grip component comprising one or more coupling portions for coupling to the electronic device,
wherein the electronic device comprises:
a display panel configured to display information;
a first group of one or more actuatable elements and a second group of one or more actuatable elements; and
a control module configured to:
determine that the electronic device is oriented in a first spatial position,
detect coupling of the one or more coupling portions to the first group of one or more actuatable elements,
cause a first device setting or device state for the electronic device to be established,
determine that the electronic device is oriented in a second spatial position different from the first spatial position,
determine that the one or more coupling portions remain coupled to the first group of one or more actuatable elements while the electronic device is in the second spatial position,
cause the first device setting or device state to be maintained,
detect de-coupling of the one or more coupling portions from the first group of one or more actuatable elements,
detect coupling of the one or more coupling portions to the second group of one or more actuatable elements, and
cause a second device setting or device state for the electronic device to be established, wherein the second device setting or device state is different from the first device setting or device state.

25. The apparatus of claim 24, wherein the first device setting or device state is a first orientation of information displayed via a display panel of the electronic device and the second device setting or device state is a second orientation of the information, and wherein the first orientation is orthogonal to the second orientation.

26. The apparatus of claim 25, wherein the first group of one or more actuatable elements comprises at least one actuatable element not included in the second group of one or more actuatable elements.

27. The apparatus of claim 24, wherein the grip component further comprises one or more user interface buttons configured to receive input from a user and generate one or more signals provided to the control module, and wherein the control module is configured to cause corresponding functions of the device to be performed based at least in part on the one or more signals.

28. The apparatus of claim 27, wherein the corresponding device functions comprise at least one of: scrolling through display screens, toggling between applications, loading one or more applications, or altering a state of the device.

29. A method, comprising:
determining, by one or more processors of an electronic device, that the electronic device is oriented in a first spatial position;
detecting, by the one or more processors, actuation of a first group of one or more actuatable elements of the electronic device;
causing, by the one or more processors, a first device characteristic to be established for the electronic device;
determining, by the one or more processors, that the electronic device is oriented in a second spatial position that is different from the first spatial position;
determining, by the one or more processors, that the first group of one or more actuatable elements remain actuated while the electronic device is in the second spatial position;
causing, by the one or more processors, the first device characteristic to be maintained;
detecting, by the one or more processors, that the first group of one or more actuatable elements are not actuated;
detecting, by the one or more processors, actuation of a second group of one or more actuatable elements of the electronic device; and
causing, by the one or more processors, a second device characteristic to be established for the electronic device, wherein the second device characteristic is different from the first device characteristic.

30. The method of claim 29, wherein causing the first device characteristic to be established comprises causing information displayed by the device to be displayed in a first orientation or causing a first device state to be established, and wherein causing the second device characteristic to be established comprises causing the information displayed by the device to be re-oriented from the first orientation to a second orientation or the first device state to be modified to a second device state.

31. The method of claim 29, wherein the first group of one or more actuatable elements are actuated upon coupling of the first group of one or more actuatable elements to at least one coupling portion of a grip apparatus and the second group of one or more actuatable elements are actuated upon coupling of the second group of one or more actuatable elements to the at least one coupling portion.

32. The method of claim 31, further comprising:
receiving, by the one or more processors via one or more transmission networks, a signal indicative of input provided by a user to the grip apparatus; and
causing, by the one or more processors, a corresponding device function to be established based at least in part on the signal.

33. The method of claim 31, wherein the grip apparatus further comprises at least one graspable portion, and wherein the second spatial position is established after coupling of the at least one coupling portion to the first set of one or more actuatable elements and engagement of the at least one graspable portion.

34. The method of claim 29, further comprising:
determining, by the one or more processors, that the electronic device is oriented in a third spatial position that is different from the second spatial position;
determining, by the one or more processors, that the second group of one or more actuatable elements remain actuated;
causing, by the one or more processors, the second device characteristic to be maintained for the electronic device;
detecting, by the one or more processors, that the second group of one or more actuatable elements is not actuated;
detecting, by the one or more processors, actuation of the first group of one or more actuatable elements of the electronic device; and
causing, by the one or more processors, the first device characteristic to be established for the electronic device.

* * * * *